Patented Mar. 29, 1938

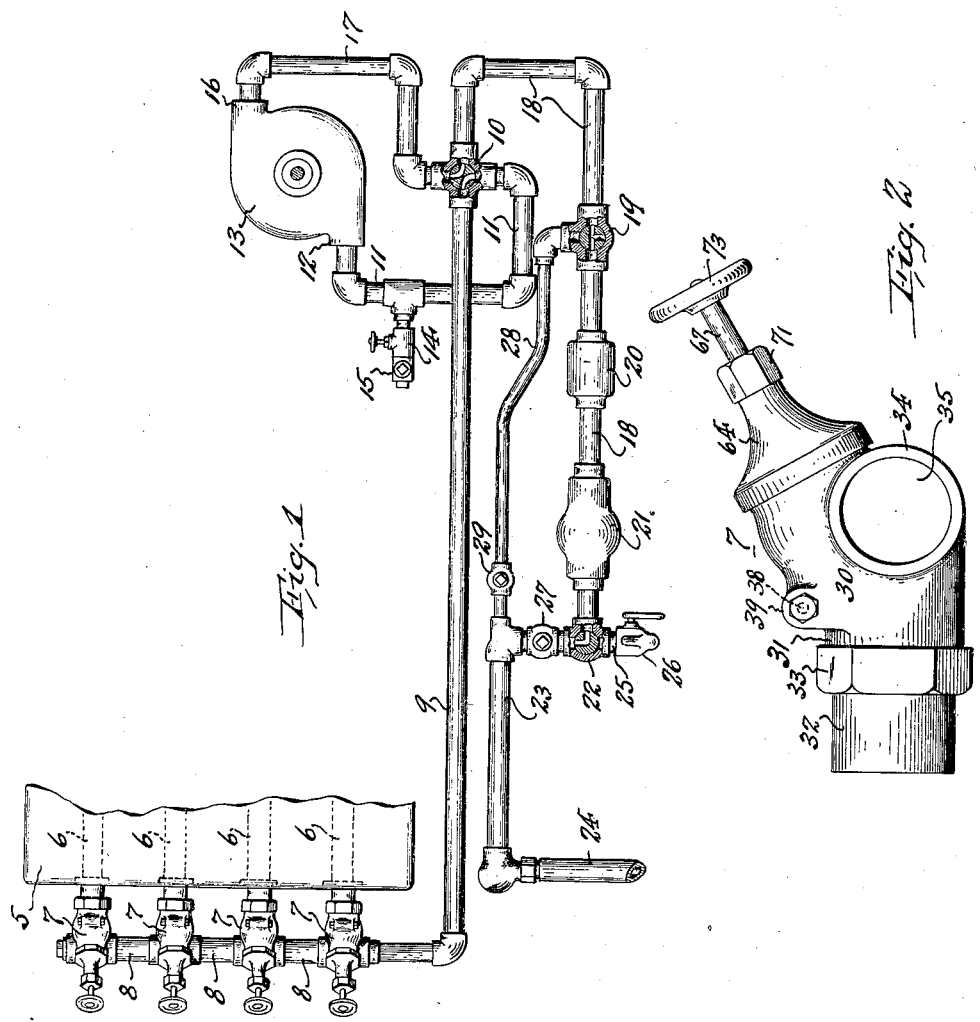

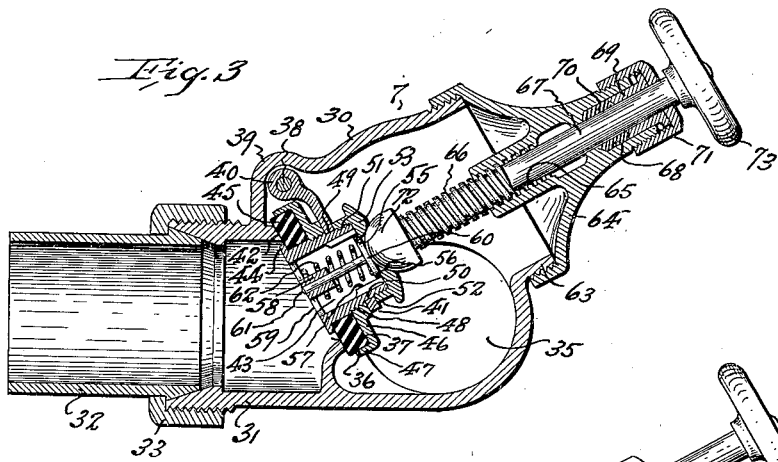
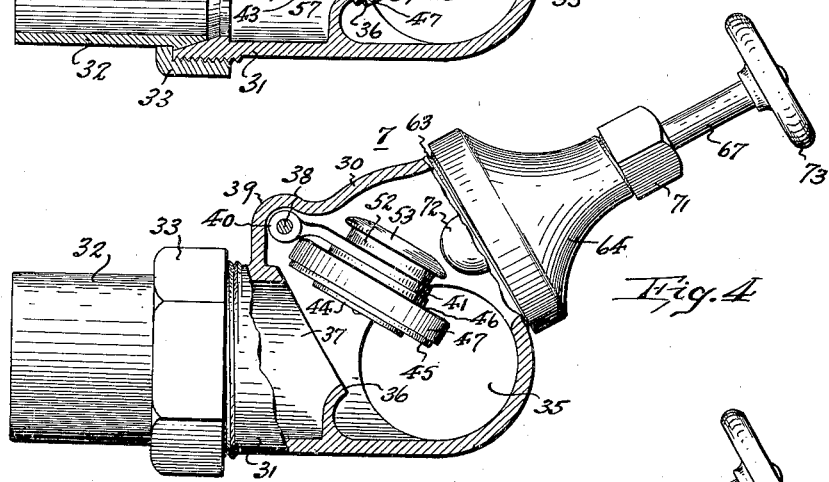
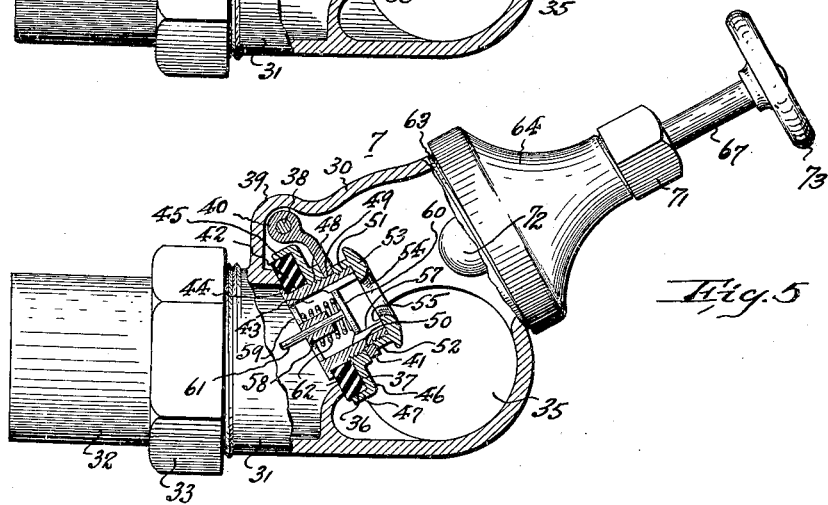

2,112,640

UNITED STATES PATENT OFFICE 2,112,640

VALVE DEVICE

Abram W. Wheaton, Maplewood, N. J., assignor to A. W. Wheaton Brass Works, Newark, N. J., a corporation of New Jersey Application February 10, 1936, Serial No. 63,091

2 Claims. (Cl. 277—45)

This invention relates to improvements in valve devices, and the invention has reference, more particularly, to a novel construction of stop check valve adapted for general use wherever a valve of this type is needed, but being especially adapted for use in connection with a manifold designed to connect a plurality of fluid sources to a common discharge conduit or line.

This invention has for an object to provide a novel construction of stop check valve adapted to freely open to outflow of fluid therethrough and having means to admit of inflow of fluid therethrough under predetermined conditions, manipulatable means being provided to positively hold the valve closed against both outflow and inflow of fluid therethrough.

Another object of this invention is to provide a novel construction of stop check valve adapted to be arranged in multiples to form a common manifold, and whereby each valve is individually manipulatable to control fluid flow from and back to the particular source of fluid with which each such valve is respectively connected, as, for example, in a manifold connected respectively by said valves with the respective compartments of oil delivery tank trucks, whereby oil from a selected compartment may be discharged through a delivery pipe line and hose, and thereafter the oil trapped in said delivery pipe line may be returned to the proper compartment thus emptying the line and also the hose preparatory to a subsequent oil delivery therethrough.

Other objects of this invention, not at this time more particularly enumerated, will be understood from the following detailed description of the same.

An illustrative embodiment of this invention is shown in the accompanying drawings, in which:

Fig. 1 is a more or less schematic showing of the oil delivery means and pipe line of an oil tank truck, the manifold connecting the same with the compartments of the tank including the novel stop check valves according to the present invention.

Fig. 2 is a side elevation of the novel stop check valve according to this invention.

Fig. 3 is an enlarged vertical longitudinal section of the novel stop check valve according to this invention, the same being shown in closed condition; Fig. 4 is in part a side elevation and in part a longitudinal section showing the valve open to outflow of oil therethrough; and Fig. 5 is a similar view showing the valve open to back flow or inflow of oil therethrough.

Similar characters of reference are employed in the hereinabove described views, to indicate corresponding parts.

Referring to Fig. 1 the reference character 5 indicates the tank of an oil delivery tank truck. Tank 1 is usually divided into a plurality of compartments, having the respective outlet pipes 6 leading therefrom brought to the rear of the tank truck for convenient accessibility. Each outlet pipe 6 is provided at its outer end with a stop check valve 7 made according to the present invention, said valves 7 being laterally connected together by pipe sections 8, whereby said valves and pipe sections together provide an oil discharge manifold. Extending from the manifold thus formed is a pipe line 9 which connects to one side of a four way plug valve 10. Connected with an adjacent side of said plug valve 10 is a pipe branch 11 leading to the suction side 12 of a pump means 13. Communicating with said pipe branch 11 is an air intake valve 14 and an inwardly opening check valve 15 associated therewith. The discharge side 16 of said pump means 13 is connected with a third side of said plug valve 10 by a pipe branch 17. From the fourth side of said plug valve 10 extends a pipe line 18 including a three way plug valve 19, and beyond the latter an air separator 20 and a measuring meter 21; said pipe line 18 being branched beyond said meter through a two-way plug valve 22, one branch, as 23 extending to and communicating with a suitably arranged and connected delivery hose 24, and the other branch, as 25 communicating with a delivery faucet 26. Said branch 23 including, beyond said two-way plug valve 22, a forwardly opening check valve 27. Connected with the lateral side of said three-way plug valve 19 is a by-pass pipe line 28 which connects with pipe line branch 23, said by-pass pipe line 28 including a forwardly opening check valve 29.

The manifold stop check valves 7, according to this invention, each comprise a body or casing 30 having an externally threaded tubular intake portion 31 longitudinally extending therefrom, cooperative with which is a union connection 32 and union coupling 33 for joining the intake in communication with an outlet pipe 6 leading from a tank compartment, or other source of fluid. At its opposite sides, said casing 30 is provided with laterally extending internally threaded necks 34 providing fluid outlets 35, and being adapted to receive the pipe connections 8, whereby a plurality of the valve casings may be joined together in manifold forming relation.

Formed at the inner end of said intake portion 31 within the casing interior is an angularly disposed or inclined valve seat means 36, which surrounds an intake port 37. Pivotally mounted on a transverse pivot means or pintle 38, which is supported through transverse bearing means 39 provided in connection with casing 30 above said valve seat means, is a swing check valve means adapted to be moved by gravity into seated relation to said valve seat means 36 for closing said intake port 37. Pivotally connected by its knuckle 40 to said pintle 38 is the hinge plate 41 upon which is supported or carried the check valve means. The check valve means comprises a central hub member 42 having an axial bore 43 extending therethrough, said hub member having at its outer end an external annular flange 44. Surrounding said hub member in stopped relation against said flange 44 is a valve disc 45 which is carried in holder 46, the annular peripheral flange 47 of which embraces the peripheral portion of said valve disc 45. Said holder is provided with an internally threaded central opening to screw onto an externally threaded portion 48 of said hub-member 42, thereby retaining said hub member, valve disc and its holder in assembled relation. Said hub member is provided beyond said externally threaded portion 48 thereof with a journal member 49 of reduced external diameter, the same being adapted to enter through an opening 50 with which said hinge plate 41 is provided. The free end portion of said journal member 49 is externally threaded, as at 51. Screwed upon the threaded end portion 51 is the internally threaded neck 52 of a hub cap 53 which engages over the outer end of the bore 43 of hub member 42. Said hub cap also serves to hold said check valve assembly in operative assembled relation to said hinge plate 41, but free to turn axially relative thereto. Said hub cap 53 is provided with a central back-flow valve port 54 communicating with the bore 43 of hub member 42, and so sized and formed as to provide an internal poppet valve seating shoulder 55 within said hub member bore 43, and an external seat 56 engageable by a manipulatable valve means to be subsequently described. Formed on the inner side of the hub member bore 43 are circumferentially spaced longitudinally extending guide ribs 57. At its outer end said hub member 42 is provided with a central perforate guide piece 58 supported by spider arms 59 from the hub member walls. Slidably centered by said guide ribs 57, for movement in said hub member bore, is a poppet valve disc 60, having a stem 61 slidably supported in said guide piece 58. Spring means 62 arranged between said spider arms 59 and said poppet valve disc 60 yieldably thrusts the latter into engagement with said internal seating shoulder 55, thus normally closing the back-flow valve port 54.

The valve casing 30 is provided with an angularly projecting externally threaded neck 63 axially aligned and opposed to said angular intake port 37 and its valve seat means 36. Threaded onto said neck 63 is a bonnet 64 having an axial internally screw-threaded section 65 to receive the threaded portion 66 of a rotatable valve stem 67. At its outer end portion said bonnet is provided with a stuffing box 68 and gland 69 to hold a packing 70 around said valve stem, said gland being retained against the packing by means of a stuffing box nut 71 which is screwed onto the outer end of bonnet 64. At its inner end said valve stem 67 is provided with a stop-valve member 72, movable by rotation of said valve stem into closing engagement with the external seat 56 of said back flow valve port 54 when the check valve means is closed, and when so engaged also serving to lock said check valve means in closed condition. At its outer end said valve stem 67 is provided with a suitable handle 73 for manipulating the same and the stop valve member 72 carried thereby.

In the operation of the novel stop check manifold valves, as utilized in the oil delivery system of tank trucks, each valve controls the discharge of oil from a given compartment of the tank 5. Normally, and when the truck is en route, all the stop check manifold valves are locked closed by turning the manipulatable stop valve member 72 into engagement with the swing check valve means, as shown in Fig. 3, thereby also closing the back-flow valve port 54. When it is desired to discharge the content of a given compartment of tank 5, the stop check manifold valve connected with its outlet 6 is opened by retracting the stop valve member 72, whereupon the swing check valve means will open to the outflow of oil through port 37 and ports 35 into the manifold and thence into pipe line 9, as shown in Fig. 4. The four-way valve 10 is thereupon set to connect pipe line 9 with the suction side of pump means 13, and the discharge side of the latter with pipe line 18; two-way valve 19 being set to close communication with by-pass pipe line 28, and valve 22 being set to communicate with branch 23 and thus with delivery hose 24. With the delivery means thus arranged, the pump means 13 is actuated, and oil is pumped from the selected compartment and discharged to point of delivery through hose 24, the volume of flow being registered by the meter 21.

After the desired quantity of oil has been pumped through the delivery lines and meter, it is desired to return the oil in the suction line 9 back to the tank compartment. To accomplish this, the four-way valve 10 is turned to connect the discharge side 16—17 of pump 13 with pipe line 9, and the air admission valve 14 in the pump suction line 11 is opened, whereupon actuation of the pump forces the oil in pipe line 9 back into the manifold. The swing check valve means in the manifold valve swings to closed relation to port 37 under pressure of the thus reversed oil flow, but the pressure of said reversed oil flow is then exerted upon the poppet valve 60 which yields against its closing spring 62 to open the back flow port 54 to the flow of oil through the bore 43 of hub member 42, and thus through intake portion 31 and the outlet pipe 6 connected thereto back into the tank compartment. After the oil in pipe line 9 has been thus returned to the proper compartment and said pipe line 9 is emptied, the manipulatable stop valve member 72 is turned to move the same into closing relation to the back flow port 54, while at the same time locking down the swing check valve means in closed relation to port 37, this being done while the pump is still running.

After the suction pipe line 9 has been thus emptied, the line 18 and hose 24 may be arranged to by-pass the meter 21, and thereupon discharged of its oil content so as to assure delivery of full measure to the customer. This is accomplished by turning the four-way valve 10 to again connect the pump discharge 16—17 with the pipe line 18, and two-way valve 19 is turned to shut off flow to meter 21 and divert the same to bypass pipe line 28, whereupon, when the pump 13 is actuated the oil lying in line 18 and 23 and in hose 24 is discharged, and these ducts are emptied and blown clean.

From the above description it will be clear that the novel construction of stop check valve is such that, when used for manifold purposes, the same will give an adequate control of the individual outlets of a plurality of tank compartments, while at the same time allowing a back flow of fluid therethrough so as to permit of emptying discharge lines connected with the manifold, which is highly desirable especially in installations connected with oil delivery tank trucks.

I am aware that some changes may be made in the construction of the swing check manifold valve as illustrated in the accompanying drawings and as hereinabove described, without departing from the scope of this invention as defined in the following claims. Hence, I do not limit the invention to the exact arrangements and combinations of the devices and parts as described in the foregoing specification, nor do I confine myself to the exact details of the construction of the various parts as illustrated in the accompanying drawings.

I claim:—

1. A valve for the purposes described, comprising a casing formed to provide a lateral through passage whereby the valve may be connected in association with similar valves in a common manifold discharge system, said casing having an intake at right angles to said through passage, the axes of said intake and through passage being disposed in a common plane, said intake having an inlet port bounded by a valve seat disposed in an oblique angular plane relative to the common plane of said intake and through passage, a dependent swing check valve cooperative with said valve seat, said check-valve having an axial back flow port, a poppet valve to normally close said back flow port, and a manipulatable stop valve means operative to positively close said back flow port and simultaneously lock said swing check-valve in closed relation to said inlet port.

2. A valve for the purposes described, comprising a casing formed to provide a lateral through passage whereby the valve may be connected in association with similar valves in a common manifold discharge system, said casing having an intake at right angles to said through passage, the axes of said intake and through passage being disposed in a common plane, said intake having an inlet port bounded by a valve seat disposed in an oblique angular plane relative to the common plane of said intake and through passage, a dependent swing check valve cooperative with said valve seat, said check-valve having an axial back flow port, a poppet valve to normally close said back flow port, the outer wall of said casing having an open neck axially aligned with said inlet port and back flow port, a bonnet attached to said neck, a manipulatable stop valve to close said back flow port and simultaneously lock said check-valve in closed relation to said inlet port, said stop valve having a stem extending outwardly through said bonnet, and said stem and bonnet having mutually cooperative threaded sections, whereby turning of the stem advances or retracts said stop valve relative to said check-valve and back flow port.

ABRAM W. WHEATON.